(12) United States Patent
Gazit et al.

(10) Patent No.: US 10,254,968 B1
(45) Date of Patent: Apr. 9, 2019

(54) HYBRID MEMORY DEVICE FOR LOOKUP OPERATIONS

(71) Applicant: Firquest LLC, San Jose, CA (US)

(72) Inventors: Hillel Gazit, Palo Alto, CA (US);
Sohail Syed, San Jose, CA (US);
Gevorg Torjyan, Fremont, CA (US)

(73) Assignee: FIRQUEST LLC, San Jose, CA (US)

( * ) Notice: Subject to any disclaimer, the term of this patent is extended or adjusted under 35 U.S.C. 154(b) by 28 days.

(21) Appl. No.: 15/151,040

(22) Filed: May 10, 2016

Related U.S. Application Data

(60) Provisional application No. 62/173,694, filed on Jun. 10, 2015.

(51) Int. Cl.
*G06F 13/00* (2006.01)
*G06F 3/06* (2006.01)

(52) U.S. Cl.
CPC .......... *G06F 3/0611* (2013.01); *G06F 3/0647* (2013.01); *G06F 3/0685* (2013.01)

(58) Field of Classification Search
CPC ........... G06F 12/00; G06F 12/10; G06F 12/02
See application file for complete search history.

(56) References Cited

U.S. PATENT DOCUMENTS

| | | | | |
|---|---|---|---|---|
| 5,440,686 A * | 8/1995 | Dahman | ................ | G06F 12/121 345/537 |
| 6,421,766 B1 * | 7/2002 | Jones, Jr. | .............. | G06F 12/123 711/136 |
| 2003/0084253 A1 * | 5/2003 | Johnson | ................ | G06F 12/123 711/144 |
| 2008/0025344 A1 * | 1/2008 | Biederman | ........... | H04J 3/0697 370/498 |
| 2013/0205105 A1 * | 8/2013 | Nakata | .................... | G06F 13/28 711/154 |
| 2013/0246698 A1 * | 9/2013 | Estan | ................... | G11C 7/1072 711/108 |
| 2015/0186258 A1 * | 7/2015 | Edelhaeuser | ....... | G06F 12/0246 711/103 |

* cited by examiner

*Primary Examiner* — Charles Rones
*Assistant Examiner* — Han V Doan
(74) *Attorney, Agent, or Firm* — Pillsbury Winthrop Shaw Pittman LLP

(57) ABSTRACT

Apparatuses and methods for performing lookup operations are provided. A content addressable memory (CAM) module disposed on a first chip includes one or more content addressable memories. A random access memory (RAM) module disposed on the first chip is configured to receive a memory address from the CAM module, the memory address being based on a search key received by the CAM module. The RAM module includes one or more random access memories configured to store data entries and counter values or timestamps for respective ones of the data entries. The RAM module also includes logic that is configured to compute the counter values or timestamps. The RAM module is configured to output a data entry corresponding to the search key, the data entry being stored in the one or more random access memories at the memory address, and a counter value or timestamp for the data entry.

19 Claims, 5 Drawing Sheets

HYBRID MEMORY DEVICE FOR LOOKUP OPERATIONS

CROSS-REFERENCE TO RELATED APPLICATIONS

This application claims priority to U.S. Provisional Patent Application No. 62/173,694, filed Jun. 10, 2015, entitled "TCAM with Counters and LRU," which is incorporated herein by reference in its entirety.

FIELD

The technology described herein relates generally to content addressable memories and more particularly to a hybrid memory device including a content addressable memory module and a random access memory module.

BACKGROUND

A typical memory, such as a random access memory (RAM), accepts an address as an input and, in response, outputs one or more data values corresponding to that address as an output. A content addressable memory (CAM) operates in a different manner. A content addressable memory receives a data value as an input and outputs an indication of whether that data value is present at any address in the content addressable memory. A CAM enables comparing an input search expression (e.g., search key) to a plurality of stored entries simultaneously. Thus, determining one or more matching entries in a CAM is substantially faster than in memories such as RAM that are accessed using memory addresses. Many network devices (e.g., bridges, switches, routers, gateways, network proxies) use a CAM or a ternary CAM (TCAM) for routing operations.

The description above is presented as a general overview of related art in this field and should not be construed as an admission that any of the information it contains constitutes prior art against the present patent application.

SUMMARY

Examples of an apparatus and a method for lookup operations are provided. An example apparatus includes a content addressable memory (CAM) module disposed on a first chip and including one or more content addressable memories. The CAM module is configured to (i) compare a search key against entries stored in the one or more content addressable memories and (ii) output a memory address indicating a match between the search key and one of the entries. The apparatus also includes a random access memory (RAM) module disposed on the first chip and configured to receive the memory address from the CAM module. The RAM module includes one or more random access memories configured to store a plurality of data entries and counter values or timestamps for respective ones of the data entries. The RAM module also includes logic that is configured to compute the counter values or timestamps. The RAM module is configured to output, based on the memory address, (i) a data entry corresponding to the search key, the data entry being stored in the one or more random access memories at the memory address, and (ii) a counter value or timestamp for the data entry.

In an example method, a search key is received. The search key is compared against entries stored in one or more content addressable memories disposed on a first chip. A memory address indicating a match between the search key and at least one of the entries is output. A data entry stored at the memory address in a random access memory is accessed, where the random access memory is disposed on the first chip. A counter value or timestamp for the data entry is computed at a logic unit disposed on the first chip. The data entry and the counter value or timestamp for the data entry is output.

DETAILED DESCRIPTION

This disclosure provides for a hybrid memory device that includes a content addressable memory (CAM), such as at ternary CAM (TCAM), and a random access memory (RAM), such as a static RAM (SRAM) or a dynamic RAM (DRAM), among others. The RAM is configured to store a plurality of data entries, as described in further detail below. In examples disclosed herein, the CAM and the RAM are disposed on the same chip. Also formed on the chip is logic for maintaining counter values, timestamps, and/or other data for respective data entries stored in the RAM. Such counter values, timestamps, and/or other data may indicate, for example, (i) a number of times a respective data entry stored in the RAM has been accessed, or (ii) a time at which the data entry was last accessed.

The use of a single chip that includes the CAM, RAM, and logic for maintaining the counter values, timestamps, and/or other data provides a number of advantages over conventional approaches. For example, as described below, placing the CAM and RAM on the same chip enables data entries on the RAM to be accessed more efficiently than in the conventional approaches. Additionally, the use of on-chip logic for computing and maintaining the counter values, timestamps, and/or other data is advantageous because it reduces overhead on other components of the system (e.g., off-chip processing components that may otherwise be responsible for computing the counter values, timestamps, and/or other data) and enables additional useful information to be returned as part of a lookup operation. These advantages and others of the instant disclosure are explained in further detail below.

Figure 1:
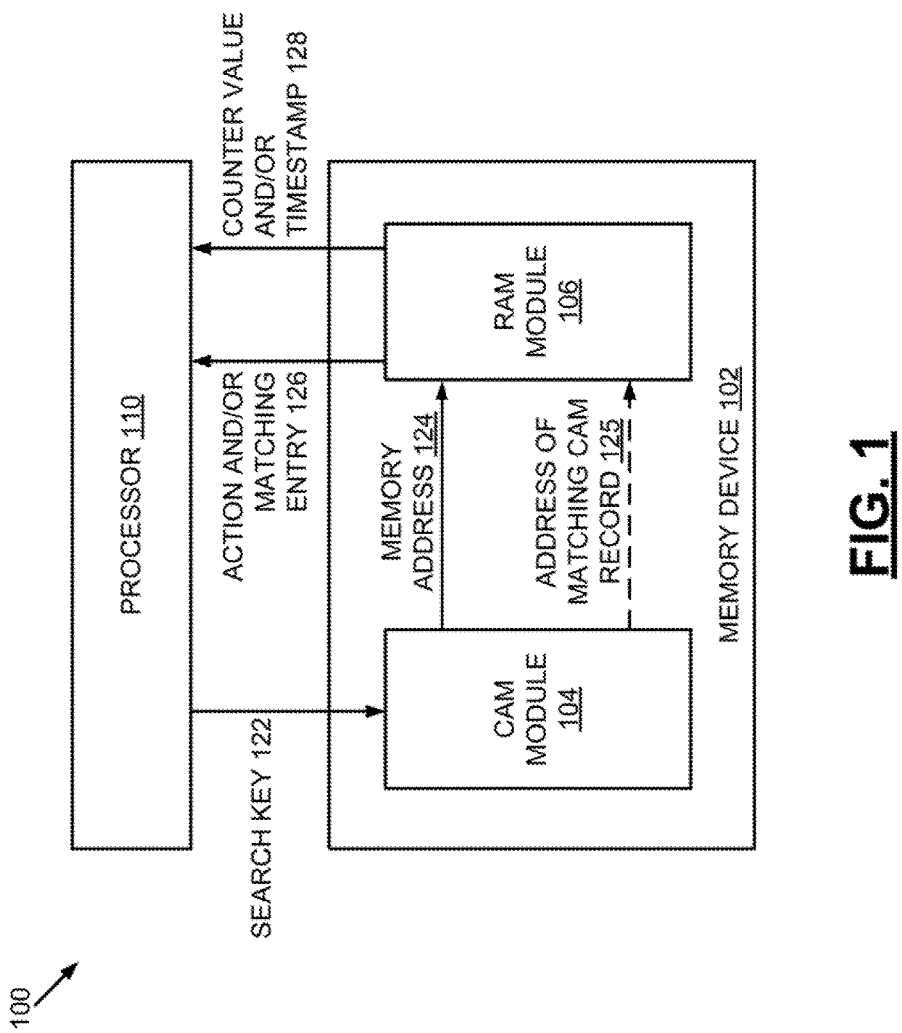
FIG. 1 depicts a hybrid memory device including a content addressable memory module and a random access memory module, according to an embodiment.

FIG. 1 depicts a system 100 including a hybrid memory device 102. In the system 100, the hybrid memory device 102 is coupled to a processor 110. The hybrid memory device 102 includes a CAM module 104 and a RAM module 106. In examples, the processor 110 transmits a search key 122 to the hybrid memory device 102 over a first interface. In response to the transmitting of the search key 122, the processor 110 receives, from the hybrid memory device 102 over a second interface, an action and/or a lookup table entry 126 that matches the search key 122. In examples, each of the CAM and RAM modules 104, 106 includes logic (e.g., logic implemented in hardware, software, or some combination thereof) for carrying out operations described below. In the example of FIG. 1, the CAM module 104 and RAM module 106 are implemented on a single, same chip. Further, in the example of FIG. 1, the processor 110 is implemented on a second chip that is separate from and coupled to the chip on which the CAM and RAM modules 104, 106 are disposed.

The system 100 of FIG. 1 forms a portion of a network device (e.g., bridge, switch, router, gateway, server proxy, network packet processing device, etc.), in examples. The hybrid memory device 102 is configured to store tables of data entries in the RAM module 106. In examples where the system 100 of FIG. 1 is implemented as a component of a network device, the tables of data entries stored in the hybrid memory device 102 may include, for example, one or more tables storing packet forwarding information. Thus, for example, when a packet is received at the network device, a data entry from a table storing packet forwarding information is accessed, with the data entry indicating a forwarding address, port, or other information to be used in forwarding the packet. The tables of data entries stored in the hybrid memory device 102 may further include one or more tables storing Access Control List (ACL) entries. In examples, the network device extracts information from a received packet (e.g., source address, destination address, etc.), and if the extracted information matches an ACL entry, a corresponding action (e.g., deny or permit the data packet to be forwarded, etc.) is taken based on the ACL entry. The accessing of data entries stored in the RAM module 106 is described in further detail below.

Figure 2:
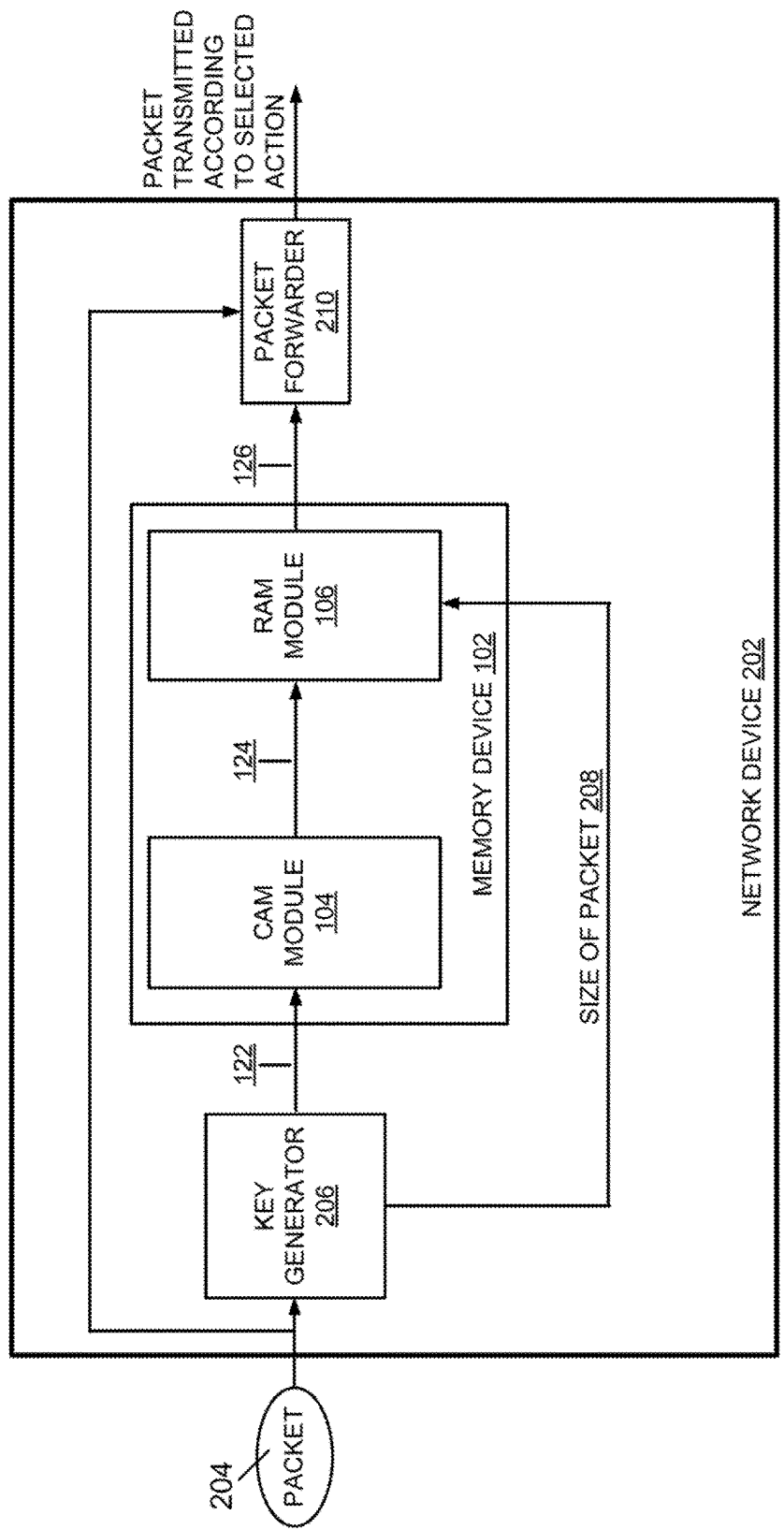
FIG. 2 depicts the hybrid memory device of FIG. 1 implemented as a component of a network device, according to an embodiment.

The processor 110 is a network processing unit (NPU) or other processor, in examples. The processor 110 is configured to use hybrid memory device 102 for some or all of its search operations. Such search operations are referred to herein as "lookup operations." For example, upon receiving a packet for which a table lookup (e.g., forwarding table lookup, ACL lookup, etc.) is required, the processor 110 submits the search to the hybrid memory device 102, in examples. To submit a search to the hybrid memory device 102, the processor 110 generates a search key, such as the search key 122 illustrated in FIG. 1. In examples, the search key is generated by key generator logic implemented by the processor 110. The use of a key generator to generate a search key is depicted in FIG. 2 and described below. In examples, the search key comprises a string of bits (e.g., a string of bits extracted from a packet header).

In the hybrid memory device 102, the search key 122 is processed in the CAM module 104. In examples, the CAM module 104 includes one or more content addressable memories (e.g., one or more ternary content addressable memories (TCAMs)) and logic for accessing the content addressable memories in accordance with examples described herein. The CAM module 104 compares the search key 122 against entries stored in the one or more content addressable memories and outputs a memory address 124 indicating a match between the search key 122 and at least one of the entries. In examples, the memory address 124 is a memory address in the RAM module 106. The search key 122 and the memory address 124 are transmitted from the CAM module 104 to the RAM module 106, in examples. The RAM module 106 includes one or more random access memories (e.g., one or more static random access memories (SRAMs)) that are configured to store data entries. Such data entries may comprise packet forwarding information and/or ACL entries, as described above. Based on its receipt of the search key 122 and the memory address 124, the RAM module 106 determines a matching data entry that corresponds to the search key 122. In examples, the matching data entry is stored in the one or more random access memories of the RAM module 106 at the memory address 124. The RAM module 106 returns an action associated with the matching data entry and/or the matching data entry 126 to the processor 110.

According to the approaches of the instant disclosure, in response to its receipt of the search key 122, the hybrid memory device 102 also returns information 128 to the processor 110. The information 128 is returned to the processor 110 along with the above-described action and/or matching entry 126, in examples. For instance, as illustrated in FIG. 1, a counter value and/or timestamp 128 for the matching data entry 126 is returned to the processor 110, in examples. The counter value indicates a number of times the matching data entry 126 has been accessed, in examples. The timestamp indicates a time at which the matching data entry 126 was last accessed, in examples.

To return such additional information 128 along with the matching data entry 126 to the processor 110, the RAM module 106 includes logic. In examples, the logic of the RAM module 106 is implemented in hardware, software, or some combination thereof. For instance, the logic is implemented using computer processors, computer logic, state machine(s), ASIC, FPGA, DSP, etc., in examples. The logic of the RAM module 106 is configured to compute the aforementioned counter values, timestamps, and/or other data for respective ones of the data entries stored in the one or more random access memories of the RAM module 106. Such information 128 may be returned to the processor 110 along with the search results 126, as noted above. The logic is further configured to store the computed counter values, timestamps, and/or other data to the one or more random access memories of the RAM module 106. It is thus noted that in examples, the one or more random access memories of the RAM module 106 are configured to store (i) a plurality of data entries (e.g., data entries comprising packet forwarding information and/or ACL entries, etc.), and (ii) counter values, timestamps, and/or other data for respective ones of the data entries.

In examples, the logic of the RAM module 106 is configured to compute and update a counter value and/or timestamp for a data entry when the data entry is accessed. Computing and updating a counter value includes, in examples, (i) reading the counter value stored in the one or more random access memories of the RAM module 106, (ii) incrementing the counter value (e.g., by "i" or by another value), and (iii) writing the incremented counter value to the one or more random access memories. Computing and updating the timestamp includes, in examples, determining a value of the timestamp (e.g., from an adder that is coupled to a system clock and configured to generate timestamp values, as described below with reference to FIG. 4) and writing the value of the timestamp to the one or more random access memories of the RAM module 106.

As described above, the hybrid memory device 102 is configured to return the counter values, timestamps, and/or other data 128 along with the search results 126 to the processor 110. Such information may be returned to the processor 110 in response to the processor 110 transmitting the search key 122 to the hybrid memory device 102, as described above. Additionally, because the counter values, timestamps, and/or other data are written to the one or more random access memories of the RAM module 106, such information can be read from the one or more random access memories by various components and subsequently processed by the components. In examples, the processor 110 is configured to read the counter values, timestamps, and/or other data stored in the one or more random access memories. This behavior performed by the processor 110 may be known as "polling." After reading the counter values, timestamps, and/or other data, the processor 110 can process this data according to various instructions and algorithms.

In an example, the processor 110 is configured to (i) read timestamps stored in the one or more random access memories, and (ii) process the timestamps using a least recently used (LRU) algorithm. Based on the processing of the timestamps, the processor 110 may purge one or more data entries of the one or more random access memories to allocate space for new data entries. Further, the processor 110 is configured to read counter values stored in the one or more random access memories and process the counter values according to an accounting or priority-setting algorithm, in examples. The accounting or priority-setting algorithm may be used to generate priority information for data entries stored in the one or more random access memories.

In examples, various other components are configured to read and process the counter values, timestamps, and/or other data stored in the one or more random access memories. In examples, the system 100 includes a state machine implemented in hardware on the chip on which the CAM and RAM modules 104, 106 are disposed. The state machine is configured to read the counter values, timestamps, and/or other data from the one or more random access memories and to process the information that is read according to one or more algorithms. For instance, the state machine may read timestamps stored in the one or more random access memories and process the timestamps using an LRU algorithm. Based on this processing, the state machine may purge one or more data entries of the one or more random access memories to allocate space for new data entries.

It is noted that in some examples, not every data entry stored in the RAM module 106 has an associated counter value or timestamp stored in the one or more random access memories. In examples, when a data entry stored in the one or more random access memories is accessed, the logic of the RAM module 106 is configured to determine, based on the memory address 124 and/or other information received at the RAM module 106, whether a counter value or timestamp is to be updated. Such other information may include, for instance, profile information. In examples, to perform a search or lookup operation, the processor 110 provides profile information to the hybrid memory device 102. Such profile information may be included as part of the search key 122 or may be information provided in addition to the search key 122. The profile information specifies a table or tables of the one or more content addressable memories against which the search key 122 should be searched. In examples, only data entries associated with certain profile information have counter values and/or timestamps. Thus, the profile information, the search key 122, the memory address 124, and/or other information are passed from the CAM module 104 to the RAM module 106, in examples. The logic of the RAM module 106 uses the profile information, the search key 122, the memory address 124, and/or other information in determining whether a counter value or timestamp is to be updated. Thus, for instance, the logic of the RAM module 106 may receive and process the profile information and determine whether a counter value and/or timestamp is to be updated based on this information (e.g., the profile information may indicate that a data entry associated with the memory address 124 does not have an associated counter value and/or timestamp, etc.). The logic of the RAM module 106 may further use the memory address 124 in making this determination. Based on a determination that a counter value and/or timestamp is to be updated, the logic of the RAM module 106 computes an updated value for the counter value and/or timestamp, in examples. The updated value is written to the one or more random access memories of the RAM module 106, as described above.

In examples, the content addressable memories of the CAM module 104 store a plurality of entries, with each of these entries being defined by a string of bits. The CAM module 104 is configured to compare the search key 122 against entries of the CAM module 104 and to output an address 125 of a matching entry stored in the one or more content addressable memories, with the matching entry including a string of bits that matches the search key 122. As illustrated in FIG. 1, the address 125 of the matching CAM record is passed from the CAM module 104 to the RAM module 106, in examples, and the RAM module 106 is configured to compute a timestamp for a data entry that corresponds to the search key 122 based on the address 125. In this example, the address 125 of the matching CAM record provides an indication of the priority of the data entry, and the RAM module 106 uses this priority information in computing the timestamp. To pass the address 125 of the matching CAM record from the CAM module 104 to the RAM module 106, additional bits are added to a result bus used in transmitting information between the modules 104, 106. For example, the result bus may be "M" bits wide in instances where the address 125 is not passed from the CAM module 104 to the RAM module 106, and the result bus may be "M+N" bits wide in instances where the address 125 is passed. In this example, the M bits are sufficient for passing the memory address 124 (and additional information such as the search key 122, in examples), and the N bits are sufficient for passing the address 125 of the matching CAM record. The address 125 of the matching CAM record is not passed to the RAM module 106 in all examples, as evidenced by the use of the dashed line for the address 125 in FIG. 1.

In conventional systems, a RAM module is not disposed on a same chip as a CAM module. For example, in conventional systems, data entries are stored on a dynamic RAM (DRAM) that is disposed on a chip that is separate from and coupled to a chip on which the CAM module is disposed. Further, in conventional systems, counter values and/or timestamps are computed by a processor (e.g., an NPU). This processor is typically disposed on a chip that is separate from and coupled to the chip on which the CAM module is disposed. The conventional systems are deficient in several respects. First, storing data entries on an off-chip DRAM creates latency in accessing the data entries. For example, to receive a data entry, (i) a processor (e.g., an NPU) transmits a search key to the CAM module, (ii) the CAM module compares the search key against CAM records to determine a memory address in the off-chip DRAM, (iii) the CAM module returns the memory address to the processor, and (iv) the processor performs a read command to read the data entry stored at the memory address in the off-chip DRAM. Passing information between the CAM module, processor, and DRAM, each of which is disposed on a separate chip, is time consuming and causes the aforementioned latency. Further, the conventional arrangement utilizes an interface between the processor and the DRAM, and this may be undesirable (e.g., it is desirable to reduce a number of interfaces between the processor and other components). Second, the conventional systems that require the processor (e.g., NPU) to compute counter values and/or timestamps place additional overhead on the processor, among other issues.

In contrast to these conventional approaches, in the approaches of the instant disclosure, the CAM module 104 and the RAM module 106 are disposed on the same chip. Also formed on the chip is logic for maintaining counter values, timestamps, and/or other data for respective data entries stored in the RAM module 106. The use of a single chip that includes the CAM module 104, RAM module 106, and logic for maintaining the counter values, timestamps, and/or other data provides a number of advantages over the conventional approaches. For example, the processor 110 receives search results in a more efficient manner than in the conventional approaches because passing of information between different chips is minimized in the approaches of the instant disclosure. For instance, in the approaches of the instant disclosure, the processor 110 submits the search key 122 to the chip 102 and subsequently receives the results 126, 128 from the chip 102, thus eliminating much of the inter-chip data passing utilized in the conventional approaches. Additionally, in the approaches of the instant disclosure, the use of the logic in the hybrid memory device 102 to compute and maintain the counter values, timestamps, and/or other data is advantageous because it reduces overhead on the processor (e.g., NPU) or other hardware. As described above, in the conventional approaches, the processor is responsible for computing the counter values, timestamps, and/or other data. Other advantages of the instant disclosure are described below.

As described above with reference to FIG. 1, in examples, the RAM module 106 computes and stores counter values for data entries, where a counter value indicates a number of times that a data entry has been accessed. In other examples, the counter value indicates a different value, such as a packet size of a packet received at a network device. To illustrate the use of the counter value that stores a value such as a packet size, reference is made to FIG. 2.

FIG. 2 depicts the hybrid memory device 102 of FIG. 1 implemented as a component of a network device 202, according to an example. The network device 202 is a switch, router, bridge, or other suitable network device, in examples. The network device 202 is configured to receive a data communication packet 204 having one or more characteristics (e.g., a source address, a destination address, etc.). The packet 204 can be received from various devices and/or components, such as from personal computers, servers, and other network devices.

A key generator 206 of the network device 202 is configured to generate the search key 122 based on characteristics of the received data communication packet 204. In examples, the key generator 206 is implemented by a processor (e.g., the processor 110 of FIG. 1) or comprises a component of a processor. For example, the key generator 206 is implemented by an NPU or comprises a component of an NPU, in examples. As described above, the CAM module 104 is configured to store a plurality of CAM entries. Logic of the CAM module 104 is configured to compare the search key 122 against the plurality of entries stored in the CAM module 104 and to output a memory address 124 indicating a match between the search key 122 and the string of bits of an entry from among the plurality of entries. As described above with reference to FIG. 1, the memory address 124 is a memory address in one or more random access memories of the RAM module 106.

The RAM module 106 is configured to receive the memory address 124 from the CAM module 104. The one or more random access memories of the RAM module 104 store a plurality of data entries, with data entries of the plurality of entries corresponding to routing actions to be taken by the network device 202. Based on its receipt of the memory address 124, the RAM module 106 passes a matching data entry and/or an action associated with the matching data entry 126 to a packet forwarder 210. The packet forwarder 210 receives the packet 210 and forwards the packet 210 in accordance with the received matching data entry and/or action associated with the matching data entry 126. In examples, the packet forwarder 210 receives the matching data entry, determines the routing action associated with the matching data entry, and transmits the packet 210 accordingly.

As described above, the CAM module 106 outputs the memory address 124 based on the search key 122, and a data entry corresponding to the search key 122 is accessed at the specified memory address 124 in the RAM module 106. In the example of FIG. 2, the counter value for the matching data entry is set equal to a size of the packet 204 or another value specified in the header of the packet 204. To accomplish this, the key generator 206 is configured to transmit to the RAM module 106 the size of the packet 204 or the other value from the header of the packet 204. The logic of the RAM module 106 is configured to (i) set the counter value for the matching data entry equal to the size of the packet 204 or the other value from the header of the packet 204, and (ii) write the counter value for the matching data entry to the one or more random access memories of the RAM module 106.

In examples, the updating of a counter value stored in the RAM module 106, as performed by logic of the RAM module 106, includes (i) reading the counter value stored in the one or more random access memories of the RAM module 106, (ii) incrementing the counter, and (iii) writing the incremented counter value to the one or more random access memories. It is noted that the counter value is incremented by different amounts in various examples. For example, in examples where the counter value indicates a number of times the data entry has been accessed, the counter value is incremented by "1" when the data entry is accessed. By contrast, in examples where the counter value indicates a size of a packet (e.g., the packet 204) or other value from the header of the packet, the counter size may be incremented by the size of the packet or by the other value.

As described above, incrementing a counter value stored in the one or more random access memories includes reading an old counter value from memory and subsequently writing an incremented counter value to memory. To avoid having to use two memory cycles for these reading and writing operations, the RAM module 106 utilizes a dual-port random access memory, in examples. The dual-port random access memory can perform a read operation and a write operation within a single memory cycle. In another example, to avoid having to use two memory cycles for the read and write operations, the RAM module 106 utilizes a segmented random access memory with queue data structures formed therein. In this example, the random access memory is divided into multiple segments, with each segment comprising a short queue data structure for storing read and write requests associated with the segment.

To illustrate the use of a random access memory divided into multiple segments, an example is presented. In the example, to implement two counters, two memory segments (segment_1 and segment_2) of the RAM module 106 are used. Each of the two memory segments includes two address locations in the example. Further, in the example, address 0 in segment_1 stores a C1.0 counter, address 0 in segment_2 stores a C2.0 counter, address 1 in segment 1 stores a C1.1 counter, and address 1 in segment_2 stores a C2.1 counter. Thus, address 0 in both memories represents counter 0 Cn0, and address 1 in both memories represents counter 1 Cn1. In one scenario, in a clock cycle 1, the Cn0 value is to be updated (e.g., incremented by 1). The RAM module 106 determines which memory segment (segment_or segment 2) is available. If it is determined that segment_1 is available, C1.0 is fetched by the RAM module 106. In the scenario, in a clock cycle 2, the Cn0 value is to be incremented again, but in the clock cycle 2, the incremented value of Cn0 from the previous cycle is being written back, such that segment 1 is busy writing back the updated C1.0 (e.g., C1.0 L+1). Because segment_1 is busy, the RAM module 106 selects the value of C1.1 to be updated.

Continuing the above example, in a subsequent clock cycle 3, the RAM module 106 writes back the updated C1.1 (e.g., CL. I+1) and fetches another counter value from segment_2. Thus, at the end of the clock cycle 3, address 0 of segment_1 and segment_2 have the value "1." The RAM module 106 obtains the total value of Cn0 as C1.0+C2.0, and the total value of Cn1 as C1.1+C2.1. In some examples, queues are used to emulate counter access. Because RAM read and write operations consume several clock cycles (e.g., multiple pipeline stages are required before data will reach or be fetched from an actual memory array, in examples), a queue look-ahead structure similar to that used in reduced instruction set computing (RISC) is utilized, in examples. Under the queue look-ahead structure, data is passed through a pipeline and from a user's point of view is executed in a single clock cycle, even though there may be a latency of multiple (e.g., approximately 5) clock cycles.

To further illustrate the use of the random access memory divided into multiple segments, another example is presented. In examples where multiple segments are utilized, in one clock cycle, one operation can be performed in any segment. Thus, for example, if instructions are "Update A" and "Update B," then (i) in a first clock cycle, A is read from a first memory segment, and (ii) in a second clock cycle, A is written to the first memory segment and B is read from a second memory segment. Further, for example, if instructions are "Update A1," "Update A2," and "Update B," then (i) in a first clock cycle, A1 is read and operation "Update A1" is queued, (ii) in a second clock cycle, A2 is read and operation "Update A2" is queued, and (iii) in a third clock cycle, B is read and A1 is written. It is noted that the operations presented above with respect to a random access memory divided into multiple segments are merely examples, and that operations involving such a random access memory differ in other examples.

In another example, to avoid having to use two memory cycles for the read and write operations, the RAM module 106 utilizes a hashed, segmented random access memory. Like the example described above, in this example, the random access memory is divided into multiple segments. Further, in this example, memory addresses of the random access memory are hashed, thus lowering the probability that all (or most) read and write requests during a period of time are for memory locations of a same, single segment. Assuming a perfect hash function and n memory segments, the probability that the same segment is accessed in consecutive clock cycles is 1/n, in examples. In examples where the hashed, segmented random access memory is utilized, a counter can be implemented using a regular single-port memory, but if a collision occurs (e.g., counter incremented in same memory bank in consecutive clock cycles), an increment operation may be skipped. In yet another example, to avoid having to use two memory cycles for the read and write operations, the RAM module 106 and logic included therein maintain two counters. One of the two counters is for even memory cycles, and the other counter is for odd memory cycles. When the logic of the RAM module 106 seeks to read a counter value stored in memory, both of the counter values are read at the same time and summed up.

Figure 3:
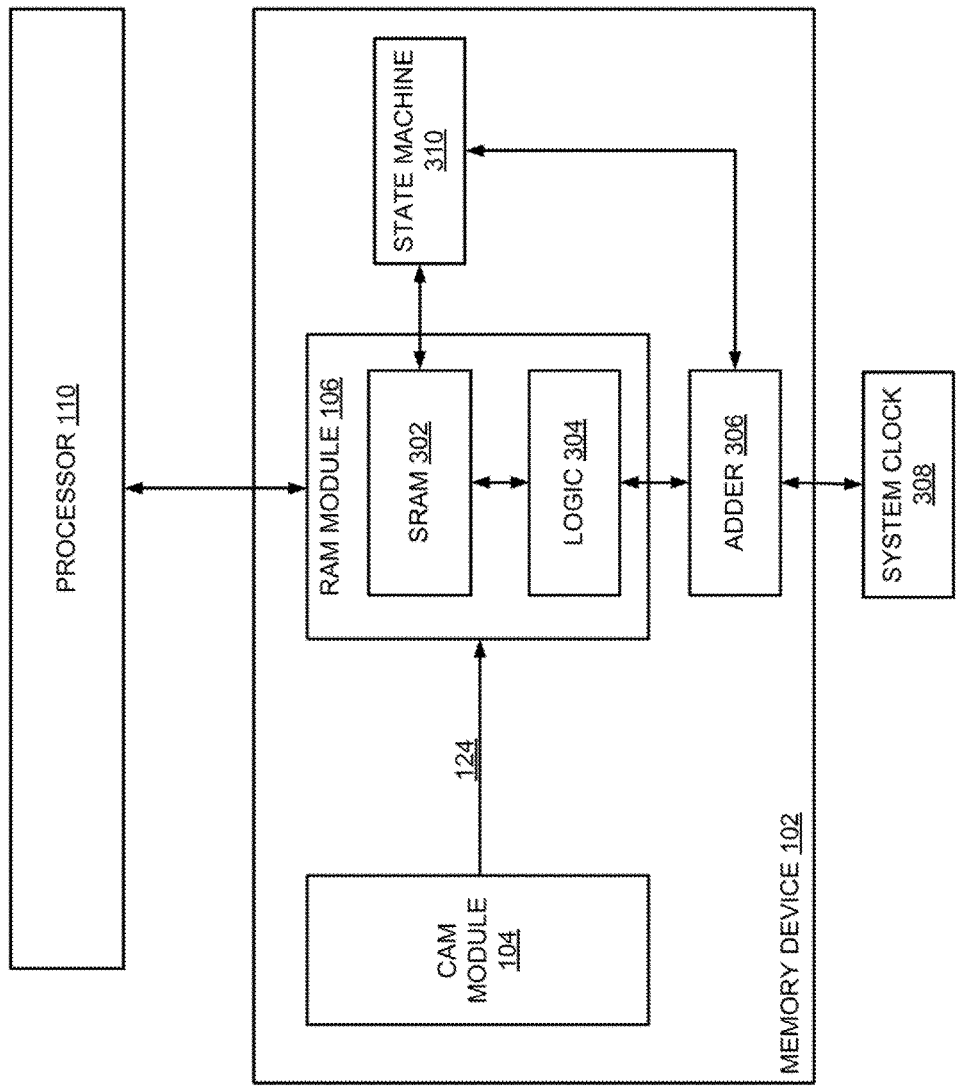
FIG. 3 depicts an implementation of the memory device of FIG. 1 including an adder used in computing timestamps, according to an embodiment.

As described above, in examples, the RAM module 106 is configured to store timestamps for respective data entries stored in the RAM module 106. Such timestamps are computed by logic of the RAM module 106 and may be stored in the one or more random access memories of the RAM module 106. In some examples, the logic of the RAM module 106 computes the timestamp based on an address 125 of a CAM record that is transmitted to the RAM module 106, as described above with reference to FIG. 1. This approach requires a wider results bus between the CAM module 104 and the RAM module 106 as compared to other examples, as noted above. In other examples, the logic of the RAM module 106 does not use the address 125 of the CAM record to compute the timestamp. In some examples, for instance, the logic of the RAM module 106 computes the timestamp based on a value of an adder. To illustrate this, reference is made to FIG. 3. This figure depicts an implementation of the memory device 102 of FIG. 1 including an adder 306 used in computing timestamps, according to an embodiment. Additionally, in this figure, the one or more random access memories of the RAM module 106 comprise static random access memory (SRAM) 302, and logic 304 for computing and maintaining counter values and timestamps is coupled to the SRAM 302 and able to read from and write to the SRAM 302.

The adder 306 is coupled to a system clock 308 and is configured to increment in response to the system clock 308. For instance, the adder 306 may increment its value by "I" each memory cycle or may increment every K memory cycles, where K is some predetermined integer value (e.g., adder 306 may increment its value every 5 memory cycles, etc.). In an example, when a data entry stored in the RAM module 106 is accessed, the logic 304 of the RAM module 106 updates the timestamp for the data entry by (i) determining a value of the adder 306, and (ii) writing the value of the adder 306 to the SRAM 302 as the updated timestamp for the data entry. The updated timestamp determined from the adder 306 may also be provided to the processor 110 (e.g., along with search results, in response to the processor 110 providing a search key 122), as described above with reference to FIG. 1.

Additionally, because the timestamps are written to the SRAM 302, the timestamps can be read from the SRAM 302 by various components and subsequently processed by the components. In examples, the processor 110 is configured to read the timestamps stored in the SRAM 302. This process may be known as "pulling." The processor 110 can then process the timestamps using an LRU algorithm, and based on the processing of the timestamps, the processor 110 may purge one or more data entries stored in the SRAM 302 to allocate space for new data entries. In an example, the processor 110 pulls timestamps for every data entry stored in the SRAM 302 once per second and perform the processing according to the LRU algorithm. The processing of the timestamps according to the LRU algorithm may be based on absolute values of the timestamps or differences between the timestamps and the value maintained by the adder 306. Processing based on the differences may enable shorter timestamps to be used.

In other examples, a state machine 310 implemented in hardware on the chip 102 is configured to read the timestamps stored in the SRAM 302 and to process the timestamps according to an LRU algorithm. Based on the processing performed by the state machine 310, the state machine 310 may purge one or more data entries stored in the SRAM 302 to allocate space for new data entries. The processing of the timestamps according to the LRU algorithm, as performed by the state machine 310, may be based on absolute values of the timestamps or differences between the timestamps and the value maintained by the adder 306.

Figure 4:
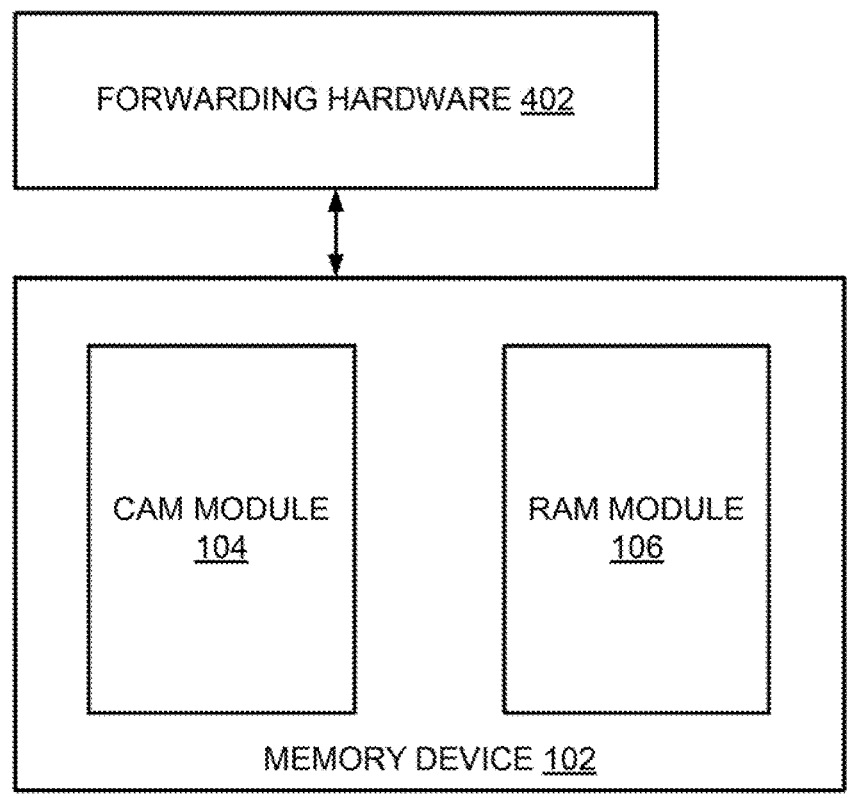
FIG. 4 depicts the hybrid memory device of FIG. 1 utilized in a software driven networking (SDN) environment.

FIG. 4 depicts the hybrid memory device 102 of FIG. 1 utilized in a software driven networking (SDN) environment. In the SDN environment of FIG. 4, an NPU is not utilized, and instead, a hardware block 402 works in conjunction with the hybrid memory device 102. The hardware block 402, labeled in FIG. 4 as "forwarding hardware," is typically a smaller hardware block than the NPU utilized in other examples. For example, the hardware block 402 may be a smaller hardware block than the processor 110 of FIGS. 1 and 3. In examples, a central processing unit is coupled to the forwarding hardware 402 and the hybrid memory device 102. The central processing unit controls the forwarding hardware 402 and/or the hybrid memory device 102, in examples. For example, logic blocks of the forwarding hardware 402 and/or hybrid memory device 102 receive instructions to be executed from the central processing unit. Further, in examples, the central processing unit performs other functions, such as configuring and initializing the device and obtaining content from the counters, among other functions.

In examples, the hardware block 402 performs functions described above as being performed by the NPU. For instance, in examples, the hardware block 402 is configured to use the hybrid memory device 102 for some or all of its search operations. Upon receiving a packet for which a table lookup is required, the hardware block 402 submits the search to the hybrid memory device 102, in examples. To submit a search to the hybrid memory device 102, the hardware block 402 generates a search key. The hardware block 402 transmits the search key to the hybrid memory device 102, and in response to the transmitting of the search key, the hardware block 402 receives from the hybrid memory device 102 (i) an action and/or a lookup table entry that matches the search key, and (ii) a counter value, timestamp, and/or other data associated with the matching lookup table entry or action. The computing of the counter value, timestamp, and/or other data performed by the hybrid memory device 102 is described above with reference to FIGS. 1-3. Additionally, because the counter values, timestamps, and/or other data are written to the one or more random access memories of the RAM module 106, the hardware block 402 can read such information from the one or more random access memories. In examples, the hardware block 402 is configured to read the counter values, timestamps, and/or other data stored in the one or more random access memories. After reading the counter values, timestamps, and/or other data, the hardware block 402 can process this data according to various algorithms. These algorithms include LRU algorithms, accounting algorithms, and priority-setting algorithms, among others.

Because the hybrid memory device 102 computes and maintains the counter values, timestamps, and/or other data, the hardware block 402 can be relatively small in size and can be configured to perform only one or more of the functions described above. These functions comprise a relatively limited set of functions, and thus, a larger network processing unit is not necessary and has been eliminated in the embodiment of FIG. 4. It is thus noted that the hybrid memory device 102 described herein may be used in a variety of networking environments, including those illustrated in FIGS. 1-4 but not limited to these environments.

Figure 5:
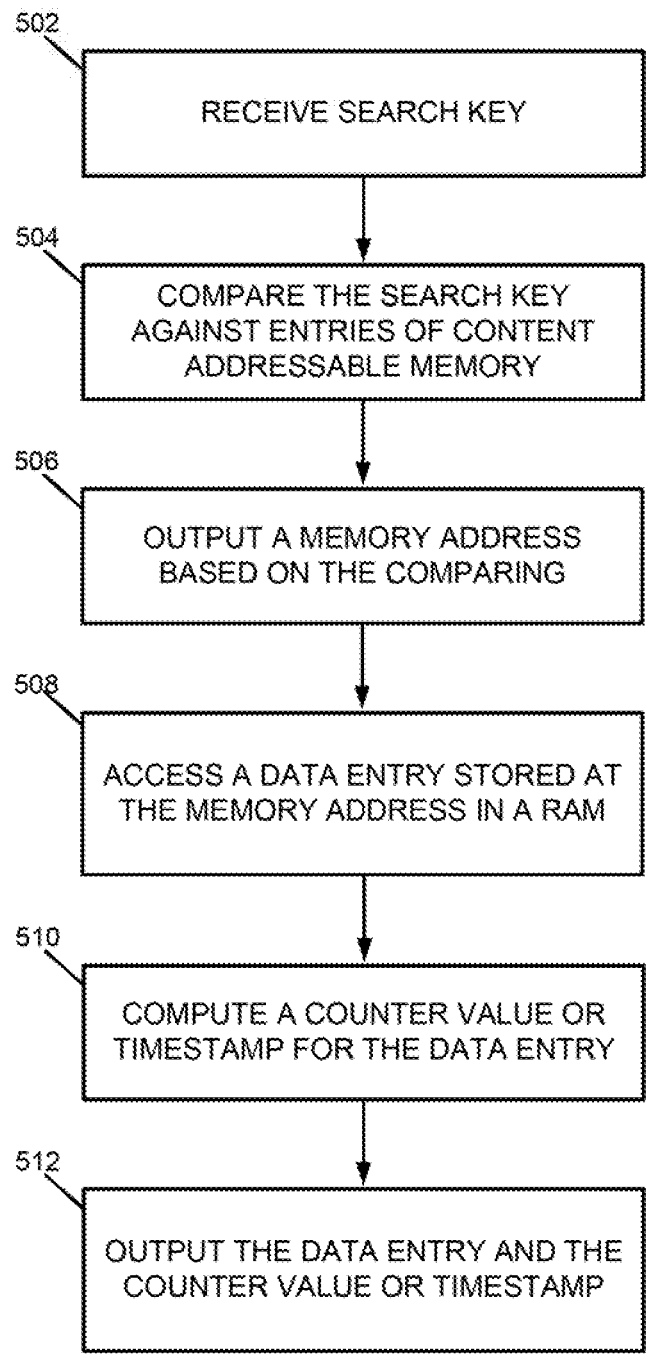
FIG. 5 is a flowchart depicting steps of an example method implemented in a hybrid memory device, according to an embodiment.

FIG. 5 is a flowchart depicting operations of an example method implemented in a hybrid memory device, according to an embodiment. At 502, a search key is received. At 504, the search key is compared against entries stored in one or more content addressable memories disposed on a first chip. At 506, a memory address indicating a match between the search key and at least one of the entries is output. At 508, a data entry stored at the memory address in a random access memory is accessed, where the random access memory is disposed on the first chip. At 510, a counter value or timestamp for the data entry is computed at a logic unit disposed on the first chip. At 512, the data entry and the counter value or timestamp for the data entry is output.

This application uses examples to illustrate the invention. The patentable scope of the invention may include other examples.

What is claimed is:

1. A network device comprising:
   a key generator configured to generate a search key corresponding to a data packet received by the network device;
   a content addressable memory (CAM) module disposed on a first chip and including one or more content addressable memories, the CAM module being configured to:
   compare the search key against entries stored in the one or more content addressable memories, wherein each of the entries is defined by a string of bits, and
   output a first memory address, and a second memory address indicating a match between the search key and one of the entries, wherein the one of the entries includes the string of bits that matches the search key;
   a random access memory (RAM) module disposed on the first chip and configured to receive the first and second memory addresses from the CAM module, the RAM module comprising:
   one or more random access memories configured to store a plurality of data entries and metadata for respective ones of the data entries, and
   logic that is configured to:
   obtain metadata associated with one of the one or more random access memories based on the received first address,
   determine, whether the obtained metadata is to be updated based on a priority associated with the received second memory address, and
   output a data entry associated with the first memory address; and
   a data-packet processor configured to process the data packet based on the output received from the logic.

2. The network device of claim 1, wherein when a data entry stored in the one or more random access memories is accessed, the logic is configured to update the metadata for the data entry stored in the one or more random access memories.

3. The network device of claim 2, wherein the updating the metadata includes:

reading a counter value stored in the one or more random access memories;
incrementing the counter value; and
writing the incremented counter value to the one or more random access memories.

4. The network device of claim 3, wherein the counter value for the data entry indicates a number of times the data entry has been accessed.

5. The network device of claim 2, further comprising:
an adder coupled to a system clock and configured to increment the counter value in response to the system clock, wherein the updating of the metadata includes (i) determining a value of the adder, and (ii) writing the value of the adder to the one or more random access memories as the updated metadata.

6. The network device of claim 3, wherein the key generator is further configured to transmit to the RAM module a size of the packet, wherein the logic is configured to (i) set the counter value for the data entry equal to the size of the packet, and (ii) write the counter value for the data entry to the one or more random access memories.

7. The network device of claim 1, wherein the metadata includes a timestamp for the data entry indicating a time instant at which the data entry was last accessed.

8. The network device of claim 1, wherein the logic is further configured to write the updated value to the one or more random access memories.

9. The network device of claim 1, further comprising:
a processor disposed on a second chip separate from and coupled to the first chip, the processor being configured to read the metadata stored in the one or more random access memories.

10. The network device of claim 9, wherein the processor is configured to:
read timestamps included in the metadata, and
process the timestamps using a least recently used (LRU) algorithm, wherein a data entry of the one or more random access memories is purged to allocate space for a new data entry based on the processing of the timestamps.

11. The network device of claim 1, further comprising:
a state machine implemented in hardware on the first chip, the state machine being configured to:
read timestamps stored in the one or more random access memories, and
process the timestamps using a least recently used (LRU) algorithm, wherein a data entry of the one or more random access memories is purged to allocate space for a new data entry based on the processing of the timestamps.

12. The network device of claim 1, wherein the one or more content addressable memories comprise a ternary content addressable memory (TCAM).

13. The method of claim 1, wherein the data-packet processor is further configured to transmit the data packet to another network device based on the data entry associated with the first memory address.

14. A method performed by a network device, the method comprising:
generating, by a key generator, a search key corresponding to a data packet received b the network device;
comparing the search key against entries stored in one or more content addressable memories disposed on a first chip, wherein each of the entries is defined by a string of bits;
outputting a first memory address, and a second memory address indicating a match between the search key and one of the entries, wherein the one of the entries includes the string of bits that matches the search key;
accessing a data entry stored at the first memory address in a random access memory, the random access memory being disposed on the first chip;
determining, based on a priority associated with the second memory address, whether metadata associated with the first memory address is to be updated;
outputting the data entry associated with the first memory address; and
processing the data packet based on the outputted data entry.

15. The method of claim 14, wherein the random access memory is configured to store a plurality of data entries and metadata for respective ones of the data entries, the method further comprising:
when a data entry stored in the random access memory is accessed, updating the metadata for the data entry stored in the one or more random access memories.

16. The method of claim 15, wherein the updating the metadata includes:
reading a counter value stored in the random access memory;
incrementing the counter value; and
writing the incremented counter value to the random access memory.

17. The method of claim 16, wherein the counter value for the data entry indicates a number of times the data entry has been accessed.

18. The method of claim 15, wherein the updating of the metadata includes;
determining a value of an adder that is coupled to a system clock, the adder being configured to increment the counter value in response to the system clock; and
writing the value of the adder to the random access memory as the updated metadata.

19. The method of claim 14, wherein the metadata includes a timestamp for the data entry indicating a time at which the data entry was last accessed.

* * * * *